(12) United States Patent
Büchmann et al.

(10) Patent No.: US 9,836,031 B2
(45) Date of Patent: Dec. 5, 2017

(54) METHOD OF CONTROLLING A PRODUCTION PROCESS USING PREDICTION MODEL OUTPUT DIRECTLY LINKING INTERACTED PROBE RADIATION INFORMATION WITH MORPHOLOGICAL PROCESS STEP CONTROL PARAMETERS

(75) Inventors: Bo Büchmann, Frederiksberg (DK); Poul Gregersen, Copenhagen (DK)

(73) Assignee: FOSS ANALYTICAL A/S, Hilleroed (DK)

( * ) Notice: Subject to any disclaimer, the term of this patent is extended or adjusted under 35 U.S.C. 154(b) by 617 days.

(21) Appl. No.: 14/376,056

(22) PCT Filed: Feb. 2, 2012

(86) PCT No.: PCT/EP2012/051729
§ 371 (c)(1),
(2), (4) Date: Aug. 25, 2014

(87) PCT Pub. No.: WO2013/113388
PCT Pub. Date: Aug. 8, 2013

(65) Prior Publication Data
US 2014/0379101 A1 Dec. 25, 2014

(51) Int. Cl.
*G05B 13/04* (2006.01)
(52) U.S. Cl.
CPC .................. *G05B 13/048* (2013.01)
(58) Field of Classification Search
None
See application file for complete search history.

(56) References Cited

U.S. PATENT DOCUMENTS

2005/0154154 A1* 7/2005 Battiste .................. B29C 47/92
526/72

OTHER PUBLICATIONS

Torbjörn A. Lestander, NIR techniques create added values for the pellet and biofuel industry, Bioresource Technology, 2008, 1589-1594 pages, Elsevier Ltd.

(Continued)

*Primary Examiner* — Wissam Rashid
(74) *Attorney, Agent, or Firm* — Harness, Dickey & Pierce, PLC (57) ABSTRACT

A method of controlling a production process including a process step for the morphological modification of a biomaterial matrix comprises obtaining digital input data acquired during each of a plurality of production runs of the process, which input data includes information from radiation within a portion of the electromagnetic or acoustic spectrum having interacted with the matrix at one or more locations within the process together with a process control parameter and production event data for the associated production run; generating in a computer a prediction model from a multivariate analysis of the digital input data, which model links the information directly with one or more of process control parameters, production run events and process control settings; and applying in the computer the prediction model to interacted information obtained from a new production run to generate as an output one or more of a process control parameter a process control event and a predicted production run event for the new production run for use in controlling the production process.

17 Claims, 3 Drawing Sheets

(56) References Cited

OTHER PUBLICATIONS

Anette Pauli-Bruns, Preparation of sustained release matrix pellets by melt agglomeration in the fluidized bed: Influence of formulation variables and modelling of agglomerate growth, European Journal of Pharmaceutics and Biopharmaceutics, Dec. 2009, 503-512 pages, Elsevier B.V.
International Search Report PCT/ISA/210 for International Application No. PCT/EP2012/051729 dated Sep. 20, 2012.
Written Opinion of the International Searching Authority PCT/ISA/237 for International Application No. PCT/EP2012/051729 dated Sep. 20, 2012.

\* cited by examiner

METHOD OF CONTROLLING A PRODUCTION PROCESS USING PREDICTION MODEL OUTPUT DIRECTLY LINKING INTERACTED PROBE RADIATION INFORMATION WITH MORPHOLOGICAL PROCESS STEP CONTROL PARAMETERS

This application is a national phase under 35 U.S.C. §371 of PCT International Application No. PCT/EP2012/051729 which has an International filing date of Feb. 2, 2012.

The present invention relates to a method of controlling a production process and in particular a process which includes a step for the morphological modification of a bio-material matrix.

In the remainder of this document the use of the singular includes the use of the plural and vice versa unless specifically stated otherwise or unless the context demands otherwise. In particular and for the avoidance of confusion it is intended that the words "a" or "an" preceding an element in the description or of a claim does not preclude the presence of or protection for a plurality of such elements.

It is generally known to monitor the chemical and/or biochemical composition of a bio-material matrix during a production process and to use the compositional information for controlling the production process in order to consistently achieve a desired compositional target of a final or an intermediate product of the production process.

Analyzing the effects of an interaction of probe radiation interaction with the bio-material matrix has been successfully employed as a means for the in-line monitoring of chemical composition. The use of infra-red, particularly near infra-red, probe radiation has found wide-spread practical application in this respect. It is now well established that absorption spectral patterns of near infra-red radiation very often contain information regarding the bio-material matrix with which the radiation has interacted. Probe radiation from other portions of the electromagnetic spectrum, for example X-ray, microwave or visible portions, or from ultrasound may also be interacted with and thereby modified by the bio-material matrix. Consequently, such interacted radiation will likely also contain useful information related to the bio-material matrix.

Morphological modification of a bio-material matrix is an integral part of many production processes and is typically found in industrial biomass, food or feedstuff production processes. Such a modification often comprises changing the shape, size, granularity and/or density of the bio-material matrix in a crushing mill, a press, a cutter, an expander or an extruder unit where compositional changes are small and of an indirect nature. Morphological modification typically consumes a major proportion of the total energy requirement for the production process and potential economic benefit may be achieved through the proper and accurate control of such a process.

Lestander, Johnsson and Grothage (Bioresource Technology 100 (2009), 1589-1594) disclose the use of spectral information for the prediction of energy consumption of a pellet pressing unit in a bio-fuel production process which employs a two component bio-material matrix (here two different types of sawdust) as a feedstock for the press. A prediction model was developed from the results of a $2^3$-factorial experiment (i.e. employing a full factorial experimental design) using three dependent variables. The first dependent variable was the composition of a set of bio-material reference samples, which were artificially constructed containing 100%, 55% and 10% of the first type of sawdust with the other type making up the balance. The other two dependent variables used to construct the prediction model were moisture content of the sawdust and drying temperature. Near infra-red radiation was employed as the probe radiation and spectra were recorded for each reference sample at a location in the process just before the pellet pressing unit. Each of these spectra was then correlated with a pellet pressing unit energy consumption measured for that reference sample. Spectral information was set as independent variables against the three dependent variables in the multivariate modelling of the data and a prediction model was established which linked spectral information to energy consumption.

A problem associated with this approach to employing spectral information in process control is the need for experiments using constructed reference samples in order to develop or update the prediction model. The combinations that are required in the experimental designs expand dramatically with increasing complexity of the bio-material matrix. In order to accommodate new variations in the composition of the bio-material matrices which are employed in the actual production process large and complex experiments need to be devised and executed with each update. This may lead to an increased difficulty in maintaining the prediction model updated.

To exemplify this, consider compound feeds manufactured for production animals. These feeds are typically based on eight or more bio-material ingredients. Often a compound feed production site will manufacture fifty or more different types of compound feed at any given time, all based on different ingredient combinations. After a while, typically one month, the compound feeds are re-formulated to reflect changes in availability and/or cost of ingredients. During such re-formulation certain ingredients may be discontinued, others may be taken into use and the proportions of ingredients for a particular feed may change profoundly. Furthermore these re-formulation activities may need to be reflected over a great many production sites. To implement a process control following Lestander et al. would require the development of a prediction model from an experiment involving 128 constructed reference samples (assuming eight components) for each of the fifty product lines and repeated with every re-formulation (i.e. monthly). If temperature and moisture content were also to be varied this would involve 512 experimental runs for each product line. This would most likely lead to considerable production 'down time' since the production lines are used to conduct the experiments and therefore makes a practical implementation of such an approach extremely difficult and potentially very costly.

According to the present invention there is provided a method of controlling a production process that includes a process step for morphological modification of a bio-material matrix feedstock, the method comprising: obtaining digital input data acquired during each of a plurality of production runs of the process, which input data includes information from probe radiation, typically from within a portion of the electromagnetic spectrum, having interacted with the feedstock at one or more locations within the process together with process control parameters and production event data for the associated production run; generating prediction models from a multivariate analysis of the digital input data, where a particular model links the interacted probe radiation information directly with a particular control parameter or production event; making the prediction models available to a computer; obtaining interacted probe radiation information for a feedstock during a new production run of the process; applying in the computer the obtained interacted information to the models to generate as an output predicted values for one or both process control parameters and production run events for the new production run; and employing the predicted values in the control, usually a feed forward control, of the morphological modification.

By developing the prediction models using interacted probe radiation information, process control parameters and production run events obtained from suitably located sensors and other input devices during actual production runs then special experimental arrangements and constructed reference samples are avoided.

Moreover, as the bio-material matrices used in the construction of the prediction models are those matrices constituting the feedstock being processed in actual production runs then predominantly only those matrices which are practically and economically possible to process commercially will be used for modelling. In addition, the prediction models so developed will be optimized in terms of ingredients and processes relevant to the production site in question. Thus the most reliable performance of these models is ensured.

Most conveniently the data subjected to the multivariate analysis may be stored in an electronic database for repeated access. Prediction models may therefore be constructed that can relatively easily be updated with new production run data as new bio-material matrices are introduced and their associated data are added to the database.

In one embodiment of the present invention the computer may have access to desired production run targets or process control settings, either pre-programmed into a memory or input by a user, against which each of the predicted process control parameters or production run events can be optimized.

The morphological modification process step may comprise feeding the bio-material matrix to a morphological modification device such as a pellet pressing unit, a cutter unit, an extruder unit, an expander unit, a milling unit; or a combination of any of these—either separately or in a single housing. The bio-material matrix may be selected from a group consisting of: a production animal feed matrix, a foodstuff matrix, a petfood matrix, an aqua-feed matrix, a biomass matrix, and an intermediate of or a component for any preceding matrix. The matrices are, in turn, typically blended from a multitude of biological base ingredients with different characteristics. Illustrative of a production animal feed matrix these ingredients may be, for example, wheat, barley, rice, maize, other cereals or by-products thereof including distillers fractions; soya beans, rapeseed, sunflower seed, other oil seeds or by-products thereof; lupins, peas, beans, other pulses or by-products thereof; or fishmeal or meat- and bonemeal or similar products of animal or maritime origin.

Usefully the step of generating the prediction model may comprise generating a prediction model using digital input data selected to enable the prediction of control parameters for use in control of one or both the rate of supply and the condition, such as temperature, of the feedstock before it is fed into the morphological modification device.

Additionally or alternatively, the step of generating the prediction model may comprise generating a prediction model using digital input data selected to enable the prediction of control parameters for use in control of the operation of the morphological modification device itself.

An exemplary embodiment of the present invention that, for illustrative purposes only, is to be employed in the manufacture of a production animal feedstuff will now be described in greater detail with reference to the drawings of the accompanying figures, of which.

Figure 1:
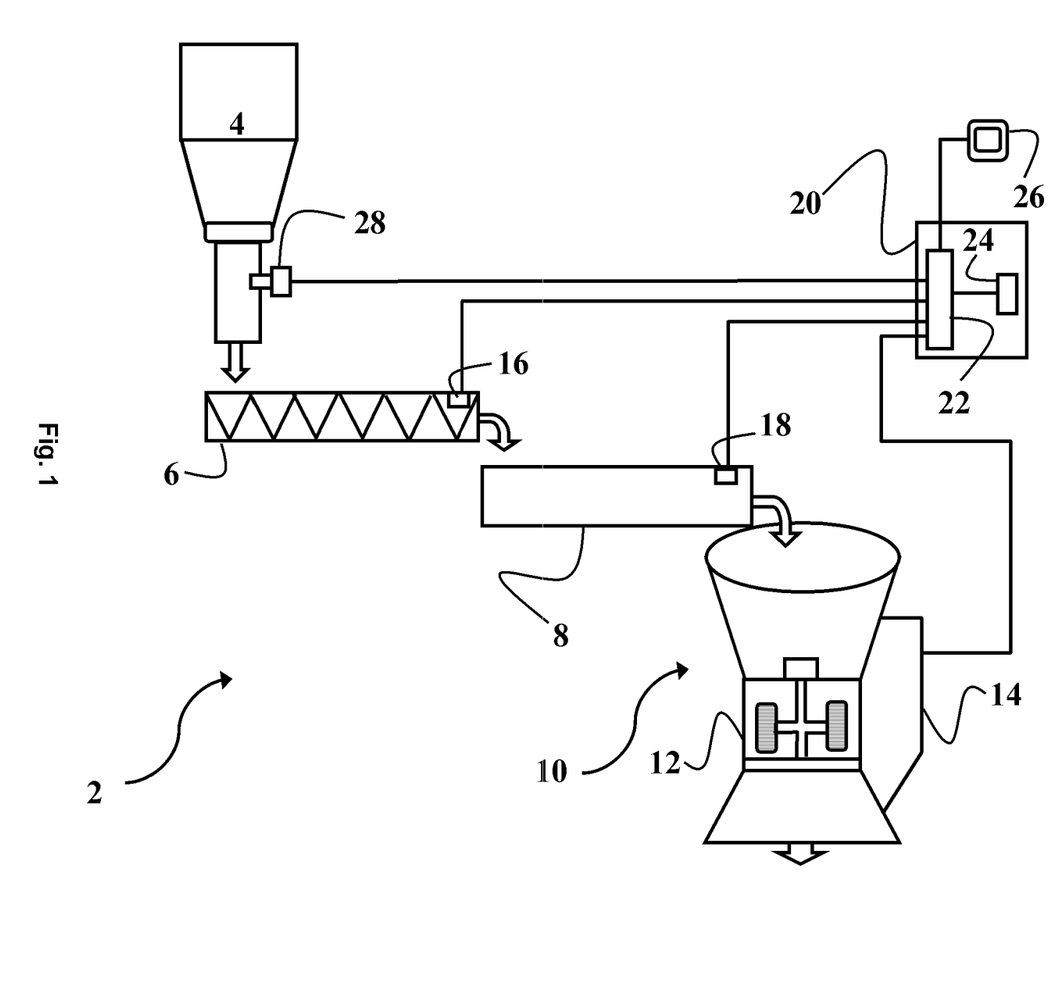
FIG. 1 illustrates a representative portion of a typical production process for the production of pelletized material.

A portion 2 of a production process for the production of pelletized material, for example here a pelletized animal feedstuff, is illustrated in FIG. 1 as a generalized representation only. It has been simplified to enable a better understanding of the present invention. In the present embodiment a hopper 4 is provided to contain a bio-material matrix feedstock which will be subjected to the morphological modification process, here pelletization. With reference to an animal feedstuff, such feedstock is typically a mix of several ingredients, for example sources of macro-nutrients, such as soya-beans, corn or other cereal grains, that make up the bulk of the feedstock and which are complemented with micro-nutrients such as minerals and vitamins, and dietary supplements as required. It will be appreciated that the feedstock may be established in a variety of different ways, for example individual components may be proportioned and mixed in-line as part of the production process so that the hopper 4 may be replaced with elements such as proportioning and mixing devices for delivering the feedstock.

A conveyor, here a variable speed screw conveyor 6, is disposed to receive feedstock from the hopper 4 in order to transport the feedstock towards a conditioning unit 8 from where it will pass to a morphological modification device 10. The conditioning unit 8 is, by way of illustration only, in the present embodiment a steam unit which operates to condition the feedstock by heating and/or introducing steam into it. The morphological modification device 10 is represented in the present embodiment as a pellet pressing unit comprising a rotary flat die pellet press 12 and controller 14. Additionally or alternatively the device 10 may comprise other known units which also operate to modify the morphology of the feedstock without substantially altering its composition. Such units may be an extruder, an expander, a milling, crushing or cutting unit or a combination of any of these. A speed regulator 16 is provided as part of the screw conveyor 6 to measure and regulate the speed at which feedstock from the hopper 4 is delivered into the conditioning unit 8. A temperature regulator 18 is provided as a part of the conditioning unit 8 to measure and regulate the temperature of the feedstock being output towards the morphological modification device 10. One or more of the controller 14, the speed regulator 16 and the temperature regulator 18 is operably connected to a process control computer 20 which, in the present embodiment, is configured to control the operation of the associated one or more pellet press 12, screw conveyor 6 and the conditioning unit 8 in order to regulate the throughput of at least the portion 2 of the production process associated with the morphological modification process.

By way of example, in the present embodiment the speed regulator 16 is adapted to provide a measure of a present feedstock delivery speed as a process control parameter to a data processor 22 within the computer 20. A memory unit 24 is accessible to the processor 22 either remotely or locally and stores, in the present embodiment, one or more prediction models. The processor 22 is adapted by means of suitable programming to employ these models to predict one or more of process control parameters, process control settings (that is, the setting of the unit to be controlled in order to achieve a desired value of the control parameter) and production run events. In the present embodiment and as will be described more fully below, the memory unit 24 holds at least a prediction model which is usable by the processor 22 for the prediction of an optimum speed setting (alternatively a necessary deviation from the present setting) or measured control parameter (here speed) to be implemented in the screw conveyor 6 in order to achieve a desired target, such as one or more of throughput of the pelletizing press 12, energy consumption or physical property of the finally produced pellets. The processor 22, in the present embodiment, is adapted to provide a control signal based on the predicted value to the speed regulator 16 for its use in the appropriate regulation of the delivery speed of the screw conveyor 6. Similarly, the temperature of the feedstock as measured by the temperature regulator 18 may additionally or alternatively be provided as a measured process control parameter to the data processor 22 of the computer 20. Application of an appropriate prediction model in the data processor 22 will result in a prediction of an optimum temperature setting, or a necessary deviation from the present setting, for the conditioning unit 20 needed to achieve a target throughput of the pelletizing press 12. Again a control signal indicative of the optimum temperature setting may be provided from the processor 22 to the temperature regulator 18 for its use in the regulation of the heat (here by regulation of steam) supplied by the conditioning unit 8.

It will be appreciated that the control parameter monitored by one unit may be employed in regulating the setting of another unit the in order to achieve a target. A prediction model stored in the memory 28 may have been developed which, when applied in the processor 22, generates for example a speed setting to be implemented via the speed regulator 16 in order to achieve as a target a desired physical property, such as durability or amount of fines, associated with the pellets produced by the production process. The speed setting, from the model, is dependent on the process control parameter of temperature as measured by the temperature regulator 18. As an illustration, a speeding up of the screw conveyor 6 will result in the feedstock passing more quickly through the conditioning unit 8. As a consequence, the feedstock spends less time being heated so that its temperature at the output of the conditioning unit 8 will fall.

By way of further example only, a display unit 24 is also provided in operable connection to the processor 22 on which information may be displayed for an operator based on a predicted production run event or a predicted process control setting for the current production run. The displayed information may then be manually applied by the operator for optimising the control of the process.

The generation of the one or more prediction models in the computer 20 together with their manner of use to provide either or both the predicted process control setting and the prediction of a production run event from one or more measured process control parameters will be described in greater detail below.

An analyzer 28 is provided to deliver probe radiation, here electromagnetic radiation, into the feedstock and to detect delivered probe radiation after its interaction with the feedstock. The analyzer 28 is arranged to deliver the electromagnetic radiation at a location in the production process generally before the morphological modification device 10 and most usefully before the unit the setting of which is to be controlled so that information which it generates can be used in a feed-forward control of that unit. In the present exemplary embodiment the analyser 28 is mounted in the process line to couple radiation into the feedstock at a location between the hopper 4 and the screw conveyor 6. Generally, the analyzer 28 may be adapted to couple probe radiation from any one or more regions of the electromagnetic or acoustic spectrum that can interact with the feedstock and which interactions are sensitive to changes its properties. Such regions of electromagnetic radiation may usefully comprise microwave, X-ray, ultraviolet, visible and/or infra-red regions. Such a region of acoustic radiations may be ultrasound.

In particular and in the present embodiment the analyzer 28 is adapted to deliver infra-red probe radiation into the feedstock. It is well known that the mid infra-red and near infra-red radiation regions tend to be especially responsive to variations in properties of such a feedstock.

The analyzer 28 is configured in a known manner to detect the infra-red probe radiation after its interaction with the bio-material matrix feedstock and to generate as an output for the processor 22 spectra data, being information that is representative of detected intensity variations of the infra-red probe radiation indexed against an expression of their wavelengths across the spectral region of interest.

An example of the method of controlling a production process according to the present invention is illustrated in the flow chart of FIG. 2 and will be described in greater detail below with particular reference to the production process portion described above and illustrated in FIG. 1. One or more prediction models are generated as a first step 210 of the method according to the present invention and made accessible to the processor 22 of the computer 20. A separate prediction model is generated for each control parameter, setting, and/or production run event that is to be predicted. Each model is generated generally according to the method which will described in greater detail with reference to the flow chart of FIG. 3 and each model links the same interacted spectral information associated with a feedstock with a different one of the parameters, settings and/or events to be predicted without the need to separately determine compositional information for the bio-material matrix.

Figure 2:
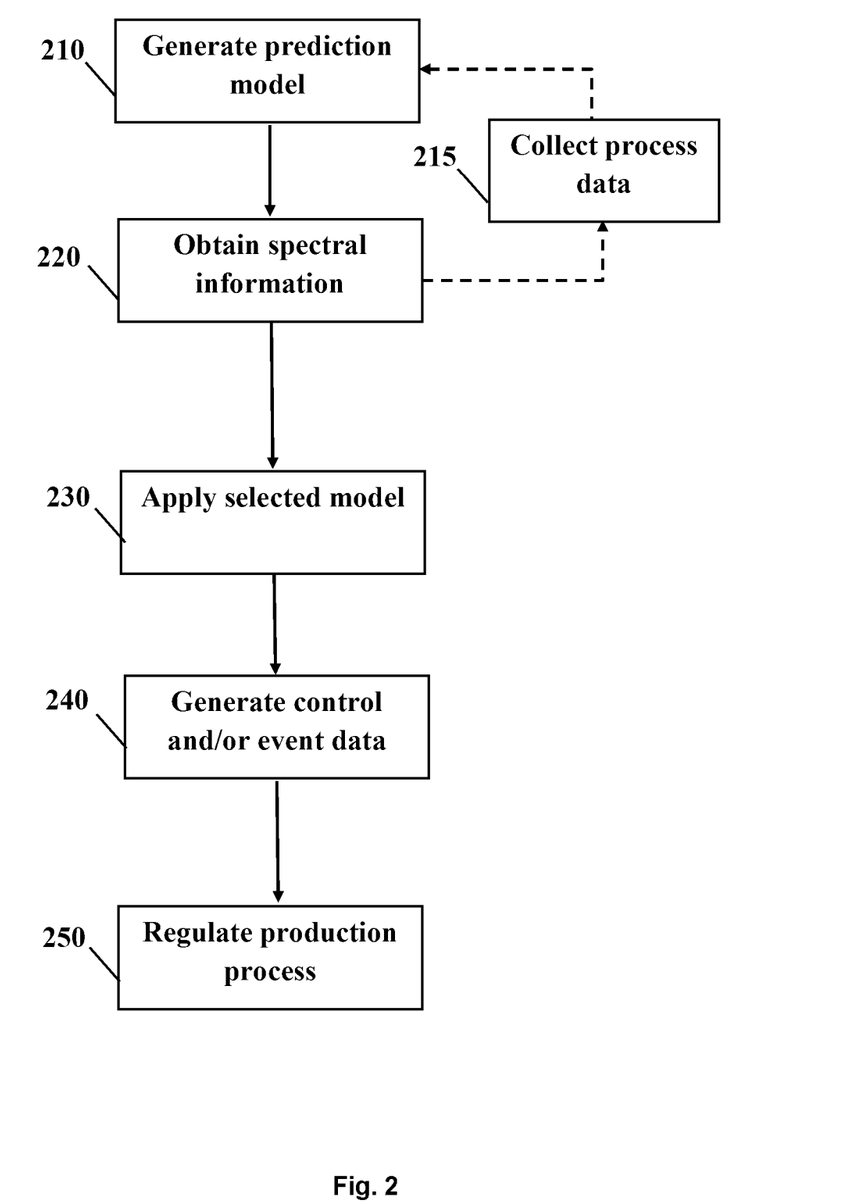
FIG. 2 illustrates a flow diagram for an embodiment of a method of monitoring a production process according to the present invention.

Once the necessary prediction models have been established then, as represented at step 220 of FIG. 2, spectral data from the bio-material matrix in a new production run is obtained by the analyzer 28 from a location in the production process before the unit or units 6, 8, 10 to be controlled. This spectral data is at this step 220 passed to the processor 22 of the computer 20.

A step 230 is performed in the computer 20 at which step the appropriate prediction model is selected from those stored in the memory 28 and is applied in the processor 22 to the interacted information obtained at step 220. This step 230 of selecting and applying the appropriate prediction model may be repeated until all of the required parameters, settings and events have been predicted. In this manner the corresponding predicted process control parameter, setting or production event data is generated at step 240. This may be, for example, a digital signal representative of a speed (measured control parameter) to be employed in screw conveyor 6 or a setting of the conditioning unit 8 to be employed in reaching a temperature (a measured parameter) of feedstock necessary to achieve one or more desired targets for the whole or a part of the production process. A target may be, for example, the optimum throughput in the morphological modification process (here pelletization); the energy consumption of the morphological process; or the desired physical properties of the output (here pellet durability or fraction of fines). In other embodiments the predicted control parameter, setting or event may be presented visually on a display unit 24 to be acted upon manually by an operator. An indication of the expected pellet pressing unit 10 energy consumption, the expected throughput of the unit 10, or the likelihood of stoppage or blockage of the unit 10 may additionally or alternatively be predicted at this step 240 and displayed for human perception, preferably for subsequent manual action.

Automatic or manual regulation of the production process is made at step 250 using the generated predictions which are output from step 240. Since the interacted spectral information obtained at step 220 is obtained from the analyzer 28 in the process line at a location before the units 6, 8, 10 to be controlled then most beneficially the regulation according to the present invention may take the form of feed-forward control of that unit 6, 8, 10.

The method according to the present invention of controlling a production process may, as is illustrated in FIG. 2, optionally include a step 215 of updating one or more of the prediction models using the interacted spectral information that is generated during the new production run in combination with process control parameters and production run events from the new run. Mathematical algorithms of known form may be employed to determine whether the new spectral information can be reliably predicted with the prediction models or whether the new information should be used to update the models. If needed, an update is performed using the spectral data collected in a similar manner at step 220 during the normal operation of the new production process without the need to separately determine compositional information for that bio-material matrix used as feedstock in the new production run. This interacted information is correlated with the necessary production process information for the new production run which are collected in a similar manner using known sensors appropriately located in the production process and added to an existing database of such correlated data which was employed at step 210 to generate the prediction original models. Step 210 is then repeated to generate the updated prediction models in a manner essentially as described below.

Figure 3:
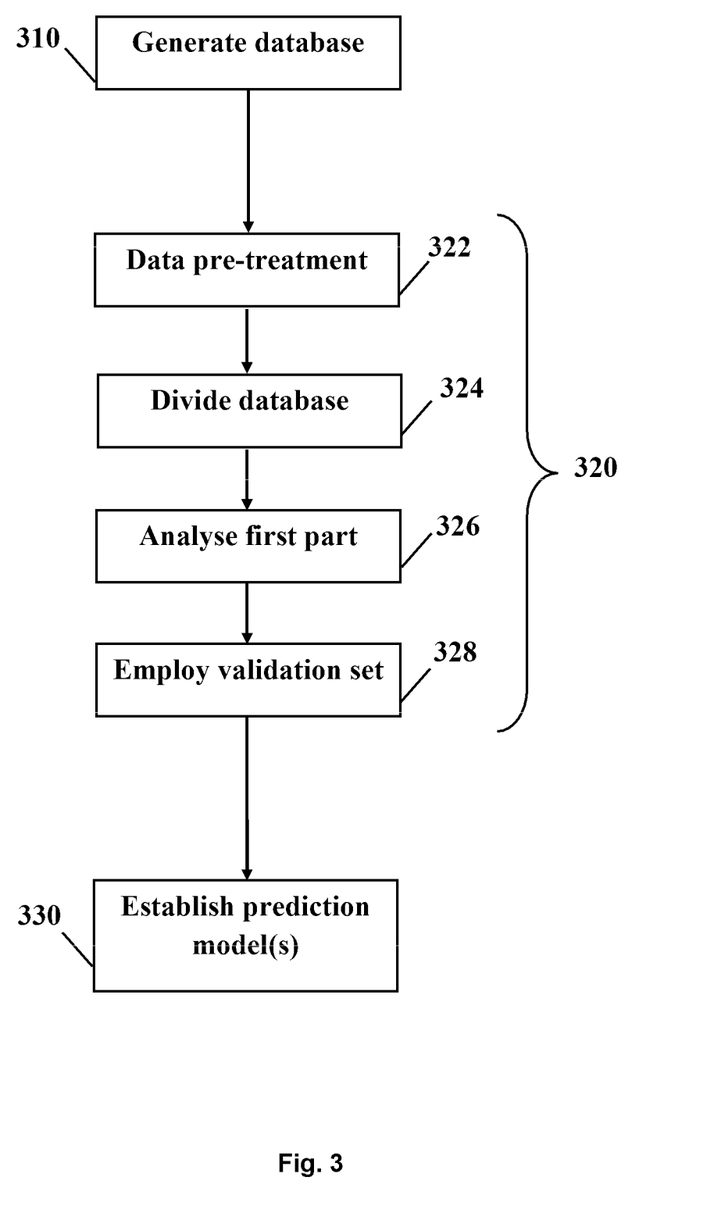
FIG. 3 illustrates an embodiment of a method of establishing a prediction model usable in the method of FIG. 2.

According to the present invention each prediction model is established in the computer 20 which is programmed to use generally known chemometric techniques which employ either linear or non-linear multivariate analysis. A mathematical algorithm (or prediction model) is thus generated by which intensity information from probe radiation having interacted with a feedstock at one or more locations within a production process is correlated with a desired process control parameter or production run event. In the present embodiment infra-red, particularly near infra-red, spectral radiation is employed. The interacted infra-red spectral information is, in the present embodiment, detected using known techniques such as transmission, reflection, reflectance, Fourier Transform or Raman Scattering techniques.

However, it will be appreciated that in other embodiments interacted spectral information may be obtained at other wavelength regions of the electromagnetic spectrum, including visible, X-ray wavelength regions, or may be obtained by other analytical techniques, including NMR, ultrasound and image analysis techniques, provided always that such radiation is influenced by the properties of the bio-material matrix feedstock that are determinative of the parameters, settings or events to be predicted. The existence of such an influence may be verified through reasonable trial and error using the aforementioned known multivariate analysis techniques on the information in question in order to determine a degree of correlation between the interacted information and the parameter, setting or event to be predicted.

A first step 310 in establishing such a prediction model is the generation of a database wherein each record represents a production run and which database is stored in the memory 28 or is otherwise made accessible to the processor 22.

In this database is stored interacted spectral information, typically from within the infra-red and preferably near infra-red portions of the electromagnetic spectrum, for the feedstock to be subject to a morphological modification process in that production run. Each record of the database also includes information identifying relevant process control parameters, settings and production run events for the associated production run. Control parameters may include speed; settings could include settings of a unit necessary to achieve a desired control parameter; and events could include information on the frequency of blockage, formulation of the feedstock, energy consumption of the morphological modification device, or the physical properties of the modified feedstock or the final product. Such information may, in a known manner, be collected automatically from sensors within the production process, may be transferred from another data storage or may be entered manually and may typically be associated with the units 6, 8, 10 in the production process associated with the morphological modification of the feedstock.

At step 320 the contents of the database is subjected in a computer to a multivariate statistical analysis. In the present example this comprises the step 324 of dividing the database from step 310 into two parts. The first and largest part, being employed as a calibration data set, is subjected to the multivariate analysis at step 326. The second part is employed at step 328 as a validation set. It will be appreciated that the precise usage and division of the content of the database will depend on the particular analysis technique employed in establishing the prediction model. Optionally a step 322 may be taken in the computer 20 by which the interacted spectral information is subjected to a data pretreatment. This is made primarily to remove effects from the interacted spectral information which are unrelated to the process control parameter or production run event. The pre-treatment step 322 employs known methodologies selected from one or more of the group consisting of: derivatives, standard normal variate, and multiplicative signal correction.

The combined output of this process step 320 is a prediction model which is established at step 330 and which provides a mathematical relationship between input interacted spectral information and a desired process control parameter or setting or a production run event. This model is for use by the computer 20 to predict that control parameter, setting or event for a feedstock in a new production run. This predicted output may then be employed in the automatic control of the production process step for the morphological modification of the feedstock necessary to achieve a target value. Additionally or alternatively, the predicted output may be a sensory signal to be acted upon by an operator in order to control the process.

According to the embodiment of the method illustrated in FIG. 2 interacted spectral information from a production run may be periodically added to the database which was generated at step 310 together with the associated process control parameters, settings and/or and production run events acquired from the same production run. The updated database may then be employed in the computer 20 to establish an updated prediction model in a manner described above without the need to construct special reference samples or the need to execute new and separate experiments.

It will be appreciated that, without departing from the invention as claimed, the computer 20 may comprise a single, local unit as described in the embodiment of FIG. 1 or it may comprise two or more sub-units, either local or remote from one another, adapted to together perform the operations of the computer 20 as described above and that the functionality of the conveyor 6, and/or the conditioning unit 8 and/or the morphological modification unit 10 may be combined in a single unit without departing from the invention as claimed.

The invention claimed is:

1. A method of controlling a production process including a morphological modification process step in which is employed a morphological modification device adapted to perform a morphological modification of a bio-material matrix based feedstock, the method comprising:
   obtaining digital input data acquired during each of a plurality of production runs of the production process, which input data includes, as interacted probe radiation information, information from probe radiation having interacted with the feedstock at one or more locations within the production process together with one or more of a process control parameter, a process control setting and production event data for an associated production run;
   generating one or more prediction models from a multivariate analysis of the digital input data, where a particular model links the interacted probe radiation information directly with a particular process control parameter, process control setting or production run event;
   making the one or more prediction models available to a data processor;
   obtaining new interacted probe radiation information for the feedstock during a new production run of the production process, the new interacted probe radiation information being information from probe radiation having interacted with the feedstock at one or more locations within the new production run of the production process;
   applying, in the data processor, one or more of the prediction models to the new interacted probe radiation information to generate, as an output, one or more of a process control parameter, a process control setting and a predicted production run event for the new production run predicted in order to achieve a target performance of the production process; and
   controlling the morphological modification process step using the output,
   wherein the interacted probe radiation information is obtained from radiation within a microwave to X-ray portion of an electromagnetic spectrum.

2. A method as claimed in claim 1 wherein controlling the morphological modification process step includes controlling one or both of a rate of supply or a condition of feedstock employed in the morphological modification process step.

3. A method as claimed in claim 1 wherein controlling the morphological modification process step includes controlling an operation of the morphological modification device.

4. A method as claimed in claim 1 wherein the output includes a predicted production run event and in that method further comprises generating a dependent sensory signal.

5. A method as claimed claim 1 wherein the morphological modification device includes one or more of a pellet pressing unit, an extruder unit, an expander unit, a cutter unit, a sieving unit, and a milling unit.

6. A method as claimed in claim 1 wherein the interacted probe radiation information is obtained from a location in a part of the production process preceding the morphological modification device.

7. A method as claimed in claim 6 wherein the interacted probe radiation information is used in a feed-forward control of the morphological modification process step.

8. A method as claimed in claim 1 wherein the interacted probe radiation information is obtained from radiation within a near infra-red portion of the electromagnetic spectrum.

9. A method as claimed in claim 1 wherein the interacted probe radiation information is representative of intensity variations of the probe radiation indexed against an expression of a wavelength of the probe radiation.

10. A method as claimed in claim 1 wherein,
    the multivariate analysis includes applying algorithms implementing methodologies including at least one of derivatives,
    standard normal variate,
    multiplicative signal correction to remove effects from the interacted probe radiation information which are unrelated to the process control parameter, and
    process control setting or production run event.

11. A method as claimed in claim 10 wherein,
    the multivariate analysis includes applying algorithms implementing methodologies including
    linear modelling algorithms including partial least squares,
    principal components regression,
    multiple linear regression, or ridge regression, or
    non-linear modelling algorithms including artificial neural networks or support vector machines to generate a predictive model.

12. A method as claimed in claim 1 wherein the interacted probe radiation information is obtained from radiation within ultrasound portion of an acoustic spectrum.

13. A method as claimed in claim 1 wherein the method further comprises:
    storing the digital input data in an updatable electronic database,
    wherein the generating the one or more prediction models includes performing a multivariate analysis of the stored digital input data.

14. A method as claimed in claim 1 wherein the bio-material matrix is a substantially biological material matrix including a foodstuff matrix, an animal-feed matrix, a pet-food matrix, an aqua-feed matrix, a biomass matrix, and/or an intermediate of, or a component for, any preceding matrix.

15. A method of controlling a production process including a morphological modification process step in which is employed a morphological modification device adapted to perform a morphological modification of a bio-material matrix based feedstock, the method comprising:
    obtaining digital input data acquired during each of a plurality of production runs of the production process, which input data includes, as interacted probe radiation information, information from probe radiation having interacted with the feedstock at one or more locations within the production process together with one or more of a process control parameter, a process control setting and production event data for an associated production run;

generating one or more prediction models from a multivariate analysis of the digital input data, where a particular model links the interacted probe radiation information directly with a particular process control parameter, process control setting or production run event;

obtaining new interacted probe radiation information for the feedstock during a new production run of the production process, the new interacted probe radiation information being information from probe radiation having interacted with the feedstock at one or more locations within the new production run of the production process;

applying, in a data processor, one or more of the prediction models to the new interacted probe radiation information to generate, as an output, one or more of a process control parameter, a process control setting and a predicted production run event for the new production run, wherein the output includes the predicted production run event; and generating a dependent sensory signal based on the output.

16. A method of controlling a production process including a morphological modification process step in which is employed a morphological modification device adapted to perform a morphological modification of a bio-material matrix based feedstock, the method comprising:

obtaining digital input data acquired during each of a plurality of production runs of the production process, which input data includes, as interacted probe radiation information, information from probe radiation having interacted with the feedstock at one or more locations within the production process together with one or more of a process control parameter, a process control setting and production event data for an associated production run, wherein the interacted probe radiation information is obtained from radiation within a microwave to X-ray portion of an electromagnetic spectrum;

generating one or more prediction models from a multivariate analysis of the digital input data, where a particular model links the interacted probe radiation information directly with a particular process control parameter, process control setting or production run event;

obtaining new interacted probe radiation information for the feedstock during a new production run of the production process, the new interacted probe radiation information being information from probe radiation having interacted with the feedstock at one or more locations within the new production run of the production process; and applying, in a data processor, one or more of the prediction models to the new interacted probe radiation information to generate, as an output, one or more of a process control parameter, a process control setting and a predicted production run event for the new production run.

17. A method of controlling a production process including a morphological modification process step in which is employed a morphological modification device adapted to perform a morphological modification of a bio-material matrix based feedstock, the method comprising:

obtaining digital input data acquired during each of a plurality of production runs of the production process, which input data includes, as interacted probe radiation information, information from probe radiation having interacted with the feedstock at one or more locations within the production process together with one or more of a process control parameter, a process control setting and production event data for an associated production run, wherein the interacted probe radiation information is obtained from radiation within ultrasound portion of an acoustic spectrum;

generating one or more prediction models from a multivariate analysis of the digital input data, where a particular model links the interacted probe radiation information directly with a particular process control parameter, process control setting or production run event;

obtaining new interacted probe radiation information for the feedstock during a new production run of the production process, the new interacted probe radiation information being information from probe radiation having interacted with the feedstock at one or more locations within the new production run of the production process; and applying, in a data processor, one or more of the prediction models to the new interacted probe radiation information to generate, as an output, one or more of a process control parameter, a process control setting and a predicted production run event for the new production run.

* * * * *